(12) United States Patent
Elsherbini et al.

(10) Patent No.: US 11,780,295 B2
(45) Date of Patent: *Oct. 10, 2023

(54) AIRCRAFT MULTI-ZONE ENVIRONMENTAL CONTROL SYSTEMS

(71) Applicant: Hamilton Sundstrand Corporation, Charlotte, NC (US)

(72) Inventors: Abdelrahman I. Elsherbini, Windsor, CT (US); Brian St. Rock, Andover, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/502,821

(22) Filed: Oct. 15, 2021

(65) Prior Publication Data

US 2022/0032735 A1 Feb. 3, 2022

Related U.S. Application Data

(63) Continuation of application No. 16/592,446, filed on Oct. 3, 2019, now Pat. No. 11,173,768.

(51) Int. Cl.
*B60H 1/32* (2006.01)
*B60H 1/00* (2006.01)
(Continued)

(52) U.S. Cl.
CPC ....... *B60H 1/3202* (2013.01); *B60H 1/00028* (2013.01); *B64D 13/02* (2013.01);
(Continued)

(58) Field of Classification Search
CPC ............ B64D 13/02; B64D 2013/0603; B64D 2013/0655; B60H 1/00028; B60H 1/3208;
(Continued)

(56) References Cited

U.S. PATENT DOCUMENTS 5,239,837 A * 8/1993 Kowalski ................ F25B 27/02
417/174
8,887,517 B2 11/2014 Truemper
(Continued)

OTHER PUBLICATIONS

European Search Report Issued in European Application No. 20182642.7 dated Dec. 2, 2020; 7 Pages.

*Primary Examiner* — Marc E Norman
(74) *Attorney, Agent, or Firm* — CANTOR COLBURN LLP

(57) ABSTRACT

An environmental control system includes a refrigerant circuit with a pump segment and an evaporator segment, an evaporator arranged along the evaporator segment and in fluid communication with of the refrigerant circuit, and a coolant circuit. The coolant circuit extends through the evaporator and is thermally coupled to refrigerant circuit by the evaporator, the coolant circuit including a first segment and a second segment arranged in parallel with one another to transfer heat from a first zone to a first portion of liquid coolant traversing the coolant circuit and transfer additional heat from a second zone to a second portion of coolant traversing the coolant circuit. Aircraft and environmental control systems are also described.

14 Claims, 3 Drawing Sheets

(51) Int. Cl.
*B64D 13/02* (2006.01)
*B60H 1/22* (2006.01)
*B64D 13/06* (2006.01)

(52) U.S. Cl.
CPC .............. *B60H 2001/00942* (2013.01); *B60H 2001/2278* (2013.01); *B64D 2013/0603* (2013.01)

(58) Field of Classification Search
CPC .. B60H 2001/00942; B60H 2001/2278; F25B 2341/00; F25B 2341/001; F25B 2341/0011; F25B 2341/0012; F25B 2341/0013
See application file for complete search history.

(56) References Cited

U.S. PATENT DOCUMENTS

| | | |
|---|---|---|
| 9,657,969 B2 | 5/2017 | Vaisman et al. |
| 10,288,325 B2 | 5/2019 | Vaisman |
| 2003/0042361 A1 | 3/2003 | Simadiris et al. |
| 2009/0000328 A1 | 1/2009 | Scherer et al. |
| 2012/0116594 A1 | 5/2012 | Aidoun et al. |
| 2013/0000348 A1 | 1/2013 | Higashiiue et al. |
| 2013/0104593 A1 | 5/2013 | Occhipinti |
| 2015/0191254 A1 | 7/2015 | Vaisman |
| 2018/0170554 A1 | 6/2018 | Elsherbini et al. |
| 2021/0101449 A1 | 4/2021 | Elsherbini et al. |

\* cited by examiner

AIRCRAFT MULTI-ZONE ENVIRONMENTAL CONTROL SYSTEMS

CROSS-REFERENCE TO RELATED APPLICATIONS

This application is a Continuation of U.S. patent application Ser. No. 16/592,446 filed Oct. 3, 2019 which is incorporated herein by reference in its entirety.

BACKGROUND

The present disclosure relates generally to environmental control, and more specifically to providing environmental control to multiple zones using an environmental control system.

Environmental control systems are commonly employed to provide temperature control in vehicles such as aircraft. In some vehicles the environmental control system provides temperature control to multiple zones within the vehicle. In such circumstances the environmental control system typically cools the air generated by the environmental control system to the temperature required for the zone with the lowest temperature requirement and divides the air into flows for the various zones supplied by the environmental control system. The flows are then mixed with varying amounts of warmer air such that air flow for a given zone is at the temperature target for the zone. The associated ducting and pressure drop within control systems can limit the number of zones and spatial distribution of the zones in such environmental control systems.

Such systems and methods have generally been acceptable for their intended purpose. However, there remains a need in the art for improved environmental systems and methods providing environmental control in multiple zones using environmental control systems.

BRIEF DESCRIPTION

An environmental control system (ECS) is provided. The ECS includes a refrigerant circuit with a pump segment and an evaporator segment, an evaporator arranged along the evaporator segment and in fluid communication with of the refrigerant circuit, and a coolant circuit. The coolant circuit extends through the evaporator and is thermally coupled to refrigerant circuit by the evaporator, the coolant circuit including a first segment and a second segment arranged in parallel with one another to transfer heat from a first zone to a first portion of liquid coolant traversing the coolant circuit, and transfer additional heat from a second zone to a second portion of coolant traversing the coolant circuit.

In addition to one or more of the features described above, or as an alternative, further examples of the ECS may include a coolant pump arranged along the coolant circuit, the first segment and the second segment fluidly coupled to the evaporator by the coolant pump.

In addition to one or more of the features described above, or as an alternative, further examples of the ECS may include a liquid coolant disposed within the coolant circuit and a refrigerant disposed within the refrigerant circuit. The refrigerant us fluidly separated from the liquid coolant and is in thermal communication with the liquid coolant through the evaporator.

In addition to one or more of the features described above, or as an alternative, further examples of the ECS may include that the coolant is in a liquid state throughout the coolant circuit.

In addition to one or more of the features described above, or as an alternative, further examples of the ECS may include that the refrigerant is in a liquid state in a first portion of the refrigerant circuit, and that the refrigerant is in a vapor state in a second portion of the refrigerant circuit.

In addition to one or more of the features described above, or as an alternative, further examples of the ECS may include a heat exchanger arranged along the refrigerant circuit.

In addition to one or more of the features described above, or as an alternative, further examples of the ECS may include a hot fluid flow in fluid communication with the heat exchanger and in thermal communication therethrough with refrigerant traversing the refrigerant circuit.

In addition to one or more of the features described above, or as an alternative, further examples of the ECS may include a bleed air source, a cabin air compressor, or and electronics cooling system thermally coupled to the heat exchanger.

In addition to one or more of the features described above, or as an alternative, further examples of the ECS may include a refrigerant pump fluidly coupling the heat exchanger to the evaporator segment.

In addition to one or more of the features described above, or as an alternative, further examples of the ECS may include a union fluidly coupling the pump segment of the refrigerant circuit with the evaporator segment of the refrigerant circuit.

In addition to one or more of the features described above, or as an alternative, further examples of the ECS may include an ejector fluidly coupling the pump segment of the refrigerant circuit with the evaporator segment of the refrigerant circuit.

In addition to one or more of the features described above, or as an alternative, further examples of the ECS may include that the ejector has a duct with a converging portion and diverging portion. The converging portion has a primary fluid inlet and a secondary fluid inlet, the diverging portion has an outlet, and the outlet fluidly couples the converging portion of the duct to the evaporator segment of the refrigeration circuit. A nozzle is arranged within the converging portion of the duct and fluidly couples the primary fluid inlet of the duct to the diverging portion of the duct.

In addition to one or more of the features described above, or as an alternative, further examples of the ECS may include a condenser fluidly coupling the ejector to the pump segment of the refrigeration circuit.

In addition to one or more of the features described above, or as an alternative, further examples of the ECS may include an overboard air duct in fluid communication with the condenser and in thermal communication therethrough with refrigerant traversing the condenser.

In addition to one or more of the features described above, or as an alternative, further examples of the ECS may include a controller operatively connected to the coolant circuit and responsive to instructions recorded on a memory to throttle the first liquid coolant portion independent of the second liquid coolant portion, throttle the second liquid coolant portion independent of the first liquid coolant portion.

In addition to one or more of the features described above, or as an alternative, further examples of the ECS may include a coolant pump arranged along the coolant circuit; and a refrigerant pump arranged along the refrigerant circuit, the controller operatively connected to the coolant pump and the refrigerant pump to control thermal communication between the coolant circuit and the refrigerant circuit through the evaporator.

In addition to one or more of the features described above, or as an alternative, further examples of the ECS may include that the controller is further configured to drive a first zone temperature within a first zone and in thermal communication with the first segment to a first temperature target, and further drive a second zone temperature within a second zone and in thermal communication with the second segment to a second temperature target.

An aircraft is also provided. The aircraft includes an ECS as described above, a first zone located within the aircraft, and a second zone also located within the aircraft and. The ECS includes a first heat exchanger arranged along the first segment of the coolant circuit, the first heat exchanger in thermal communication with the first zone; a first segment flow control valve fluidly coupling the first heat exchanger to the coolant circuit; a second heat exchanger arranged along the second segment of the coolant circuit, the second heat exchanger in thermal communication with a second zone; and a second segment flow control valve fluidly coupling the second heat exchanger to the coolant circuit.

An environmental control method is additionally provided. The method includes, at an ECS as described above, dividing liquid coolant into a first liquid coolant portion and a second liquid coolant portion; transferring a first heat flow from a first zone to the first liquid coolant portion; and transferring a second heat flow from a second zone to the second liquid coolant portion.

In addition to one or more of the features described above, or as an alternative, further examples of the environmental control method may include communicating the first liquid coolant portion and the second liquid coolant portion to the evaporator, transferring coolant circuit heat from the liquid coolant to a secondary refrigerant flow traversing the evaporator, and accelerating the secondary refrigerant flow with a primary refrigerant flow to form a singular refrigerant flow.

Technical effects of the present disclosure include the capability to provide temperature control to zones remote from the refrigeration segment without employing ducts, limiting size of the environmental control systems. Technical effects also include the capability to provide temperature control by throttling liquid coolant flow provided to a given zone instead of intermixing warmer air with air subsequent to cooling, limiting efficiency losses associated with cooling air to below the temperature required for the given zone. Technical effects additionally include the capability to power the refrigeration segment with heat recovered from another system on the vehicle, e.g., waste heat, improving efficiency of the ECS. In certain applications low temperature air, e.g., cabin air conditioning air or outside ram air, can be used to condense refrigerant within the refrigerant segment, further improving efficiency of the ECS.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
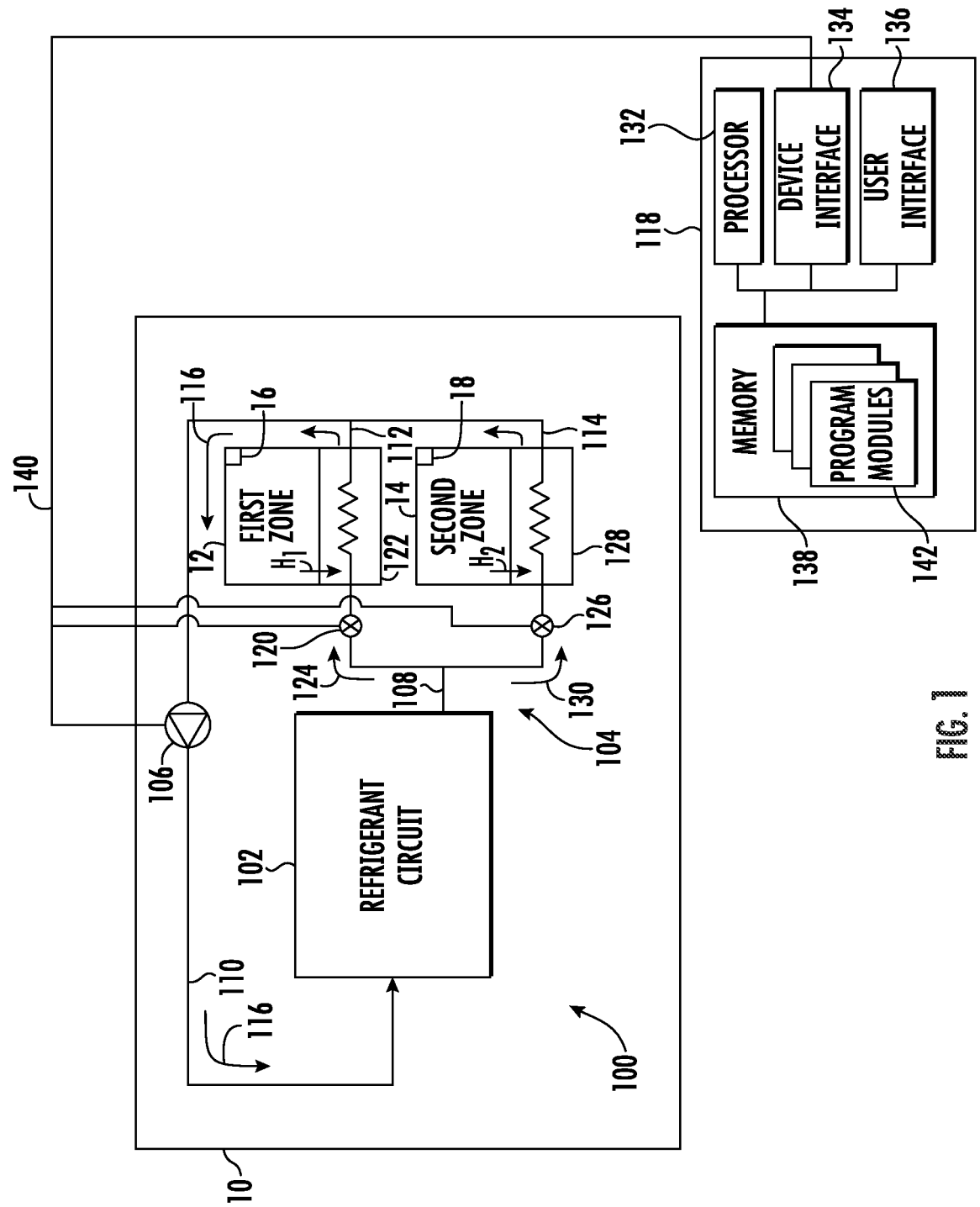
FIG. 1 is a schematic view of a vehicle having a plurality of environmentally controlled zones and an environmental control system constructed in accordance with the present disclosure, showing a liquid segment with parallel coolant segments fluidly coupling the environmentally controlled zones to the environmental control system.

Reference will now be made to the drawings wherein like reference numerals identify similar structural features or aspects of the subject disclosure. For purposes of explanation and illustration, and not limitation, a partial view of an exemplary example of an environmental control system (ECS) constructed in accordance with the present disclosure is shown in FIG. 1 and is designated generally by reference character 100. Other examples of environmental control systems, vehicles having zones environmentally controlled by environmental control systems, and environmental control methods in accordance with the present disclosure, or aspects thereof, are provided in FIGS. 2 and 3, as will be described. The systems and methods described herein can be used for providing environmental control to zones on vehicles, such as in aircraft, though the present disclosure is not limited to providing environmental control to zones on aircraft or to vehicles in general.

Referring to FIG. 1, a vehicle 10, e.g., an aircraft, is shown. The vehicle 10 includes a first zone 12 with a first zone temperature $T_1$, a second zone 14 with a second zone temperature $T_2$, and the ECS 100. The first zone 12 has a first temperature target 16 and the second zone 14 has a second temperature target 18. In certain examples the second temperature target 18 is different than the first temperature target 16. In accordance with certain examples the second temperature target 18 can be equivalent to the first temperature target 16. Although the vehicle 10 in FIG. 1 is shown having two (2) zones it is to be understood and appreciated vehicles having a single zone and more than two (2) zones can also benefit from the present disclosure. Further, while shown separately, it is contemplated that the first zone 12 and the second zone 14 may be able to share at least some air, e.g., being different portions of singular cabin volume.

The ECS 100 includes refrigerant circuit 102, a coolant circuit 104, and a controller 118. The coolant circuit 104 includes a coolant pump 106, a supply conduit 108, and a return conduit 110. The coolant circuit 104 also includes a first segment 112, a second segment 114, and a liquid coolant 116.

The coolant pump 106 is arranged along the return conduit 110, fluidly couples the first segment 112 and the second segment 114 to an evaporator 144 (shown in FIG. 2) through the supply conduit 108 and is arranged to pressurize the liquid coolant 116 as the liquid coolant 116 traverses the coolant pump 106. As will be appreciated by those of skill in the art pressurizing the liquid coolant 116 circulates the liquid coolant 116 through the first segment 112 and the second segment 114 via the supply conduit 108 and the return conduit 110. In certain examples the liquid coolant 116 is in a liquid state throughout an entirety of the coolant circuit 104. In accordance with certain examples the liquid coolant 116 can include a brine or a water/glycol mixture, which limits (or eliminates entirely) the hazard otherwise present should a leak develop within the coolant circuit 104.

The first segment 112 of the coolant circuit 104 includes a first segment flow control valve 120 and a first heat exchanger 122, and fluidly couples the supply conduit 108 to the return conduit 110. The first heat exchanger 122 is in thermal communication with the first zone 12 for communication of a first heat flow $H_1$ between the first zone 12 and the first heat exchanger 122. The first heat exchanger 122 is also in fluid communication with the coolant circuit 104 and in this respect fluidly couples the first segment flow control valve 120 to the return conduit 110.

The first segment flow control valve 120 is arranged along the first segment 112, fluidly couples the supply conduit 108 with the first heat exchanger 122 and is configured to control the mass flow rate of a first liquid coolant portion 124 traversing the first heat exchanger 122. In this respect the coolant circuit 104, and more specifically the first segment flow control valve 120, is operatively associated with the controller 118. The controller 118 is in turn configured to throttle coolant flow through the first segment 112 independent of liquid coolant flow through the second segment 114 via the first segment flow control valve 120.

The second segment 114 of the coolant circuit 104 includes a second segment coolant flow control valve 126 and a second heat exchanger 128 and fluidly couples the supply conduit 108 to the return conduit 110. The second heat exchanger 128 is in thermal communication with the second zone 14 for communication of a second heat flow $H_2$ between the second zone 14 and the second heat exchanger 128. The second heat exchanger 128 is also in fluid communication with the coolant circuit 104 and in this respect fluidly couples the second segment coolant flow control valve 126 to the return conduit 110.

The second segment coolant flow control valve 126 is arranged along the second segment 114, fluidly couples the supply conduit 108 with the second heat exchanger 128 and is configured to control the mass flow rate of a second liquid coolant portion 130 traversing the second heat exchanger 128. In this respect the second segment coolant flow control valve 126 is also operatively associated with the controller 118, the controller 118 also configured to throttle coolant flow through the second segment 114 independent of liquid coolant flow through the first segment 112 via the second segment coolant flow control valve 126.

The controller 118 includes a processor 132, a device interface 134, a user interface 136, and a memory 138. The device interface 134 connects the controller 118 with the first segment flow control valve 120 and the second segment coolant flow control valve 126, e.g., through a wired or wireless communication link 140. The processor 132 is disposed in communication with the device interface 134 for communication therethrough with the wireless communication link 140, and is further communication with the user interface 136, and the memory 138. The memory 138 includes a non-transitory machine-readable medium having a plurality of program modules 142 recorded on the medium. The plurality of program modules 142 having instructions recorded on the plurality of program modules 142 that, when read by the processor 132, cause the processor 132 execute certain operations. Among those operations are operations of a method 200 (shown in FIG. 3), as will be described. It is contemplated that the controller 118 can be implemented using circuitry, software, or a combination of circuitry and software.

Figure 2:
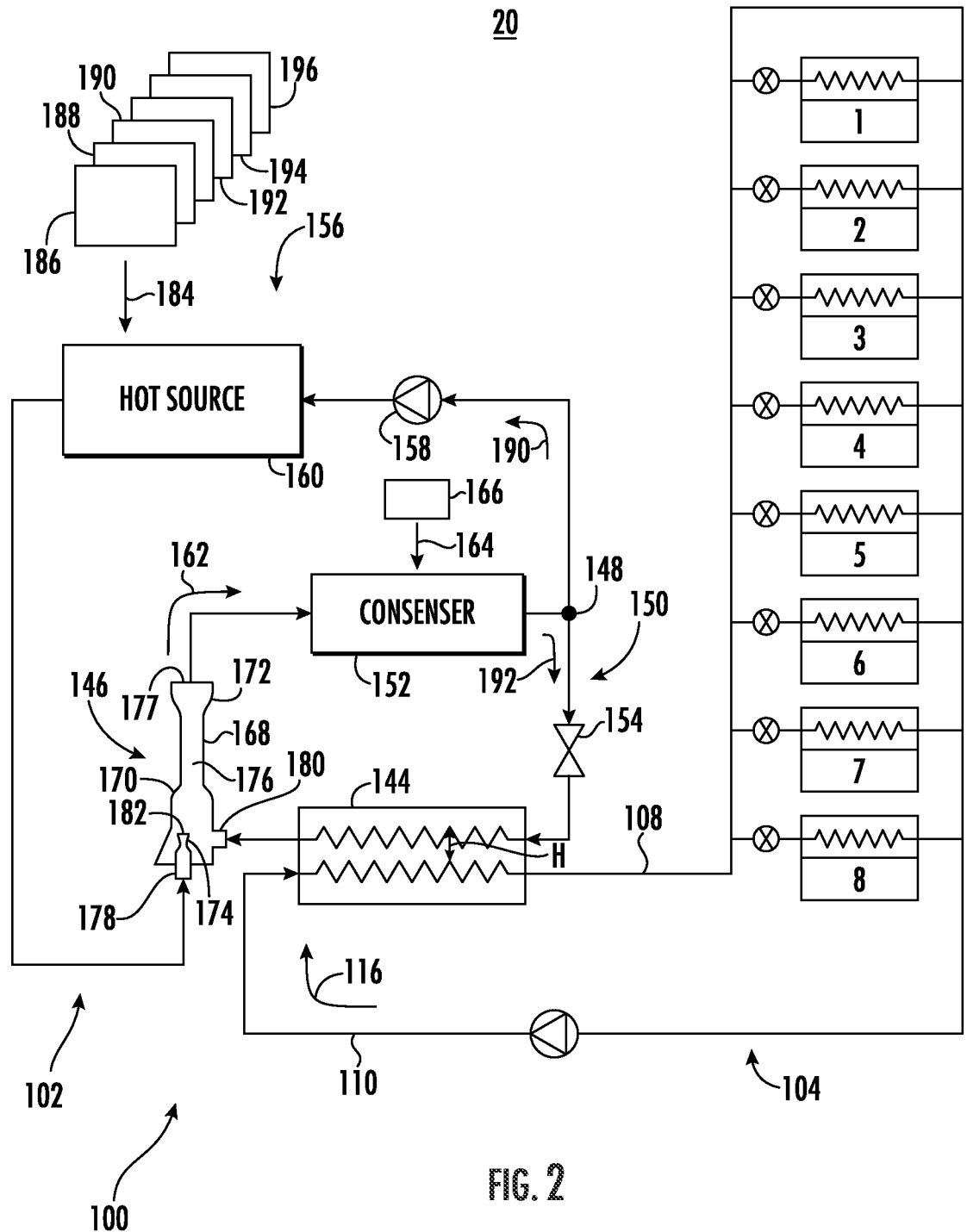
FIG. 2 is a schematic view of the environmental control system of FIG. 1 according to an example implementation, showing a refrigerant circuit having a pump segment and an evaporator segment fluidly coupled to one another and in thermal communication with the coolant circuit.

With reference to FIG. 2, the ECS 100 is shown. The ECS 100 additionally includes an evaporator 144, an ejector 146, and a union 148. The ECS 100 further includes a refrigerant evaporator segment 150 with a condenser 152 and an expansion valve 154, a refrigerant pump segment 156 with a refrigerant pump 158 and a heat exchanger 160, and a refrigerant 162.

The evaporator 144 is arranged along the coolant circuit 104 and fluidly couples the return conduit 110 of the coolant circuit 104 with the supply conduit 108 of the coolant circuit 104. The evaporator 144 is also arranged along the refrigerant evaporator segment 150 of the refrigerant circuit 102 and fluidly couples the expansion valve 154 to the ejector 146. It is contemplated that the evaporator 144 be arranged to communicate coolant circuit heat H between the liquid coolant 116 traversing the evaporator 144 of the coolant circuit 104 and the refrigerant 162 traversing the evaporator 144 through the refrigerant evaporator segment 150. In certain examples the refrigerant 162 can include a hydrofluorocarbon such as R-134a. In accordance with certain examples the refrigerant can includes a hydrofluoroolefin such as R1233zd. It is also contemplated that the refrigerant can include tetrafluoropropene such as R1234yf.

The expansion valve 154 is arranged along the refrigerant evaporator segment 150, fluidly couples the union 148 to the evaporator 144, and is arranged to expand the refrigerant 162 provided to the expansion valve 154. The union 148 fluidly couples the condenser 152 with the refrigerant pump segment 156 and the refrigerant evaporator segment 150. More specifically, the union 148 fluidly couples the condenser 152 to both the expansion valve 154 of the refrigerant evaporator segment 150 and to the refrigerant pump 158 of the refrigerant pump segment 156.

The condenser 152 fluidly couples the ejector 146 to the union 148. The condenser 152 is also in fluid communication with a cold sink flow 164 and in this respect is configured to condense refrigerant vapor received from the ejector 146 into a liquid refrigerant. In accordance with certain examples the cold sink 164 is provided by a ram air duct 165 fluidly coupling the condenser 152 with the external environment 20. In accordance with certain examples the cold sink flow 164 is provided by an overboard air duct 166 fluidly coupling the first zone 12 (shown in FIG. 1) and/or the second zone 14 (shown in FIG. 1) to the external environment 20, which in certain applications allows sinking the refrigerant circuit 102 to a temperature below that of the external environment 20.

The ejector 146 fluidly couples both the refrigerant pump segment 156 and the refrigerant evaporator segment 150 to the condenser 152. In this respect the ejector includes a duct 168 with a converging portion 170 and a diverging portion 172, and a nozzle 174. The diverging portion 172 of the duct 168 has an outlet 177 that fluidly couples the converging portion 170 of the duct 168, and thereby the nozzle 174, to the condenser 152.

The converging portion 170 of the duct 168 is connected to the diverging portion 172 of the duct 168 at a throat 176 and has a primary fluid inlet 178 and a secondary fluid inlet 180. The secondary fluid inlet 180 fluidly couples the refrigerant evaporator segment 150 to the converging portion 170 of the duct 168. The nozzle 174 is supported within the converging portion 170 of the duct 168, has a nozzle outlet 182, and fluidly couples the primary fluid inlet 178 to the nozzle outlet 182. The nozzle outlet 182 is in turn arranged within the converging portion 170 of the duct 168 and fluidly couples the primary fluid inlet 178 to the converging portion 170 of the duct 168.

The heat exchanger 160 is arranged along the refrigerant pump segment 156 and fluidly couples the refrigerant pump 158 to the primary fluid inlet 178 of the duct 168. More specifically, the heat exchanger 160 fluidly couples the refrigerant pump 158 to the nozzle 174 supported within the converging portion 170 of the duct 168, refrigerant 161 urged by the refrigerant pump 158 through the heat exchanger 160 thereby entering the duct 168 and accelerating refrigerant entering the duct 168 through the secondary fluid inlet 180.

The refrigerant pump 158 fluidly couples the union 148 to the heat exchanger 160. As will be appreciated by those of skill in the art in view of the present disclosure, employing the refrigerant pump 158 to pressurize (and drive) the refrigerant 162 while in a liquid state through the refrigerant pump segment 156 limits the energy required to circulate the refrigerant 162 through refrigerant circuit 102 by avoiding the need to employ a compressor, which generally require more energy to compress refrigerant vapor. In this respect it is contemplated that the refrigerant 161 be in a liquid state in a first portion of the refrigerant circuit, e.g., between the condenser 152 and the heat exchanger 160 as well as between the condenser 152 and the expansion valve 154, and the refrigerant 161 in a partial or full vapor state in a second portion of the refrigerant circuit, e.g., between the heat exchanger 160 and the condenser 152.

A hot fluid flow 184 is in fluid communication with the heat exchanger 160, and therethrough is in thermal communication with the refrigerant 162 traversing the refrigerant pump segment 156, to add energy to the liquid refrigerant 161 urged through the heat exchanger 160 prior to entering the primary fluid inlet 178 of the ejector 146. In certain examples the hot fluid flow 184 is communicated to the heat exchanger 160 from a bleed air source 186. In accordance with certain examples the hot fluid flow 184 is communicated to the heat exchanger 160 from a cabin air compressor 188. It is also contemplated that the hot fluid flow can be provided by an electronics cooling system 190, a water/glycol flow 192, a fuel flow 194, and/or a lubricant flow 196. As will be appreciated by those of skill in the art, adding energy to the refrigerant 162 urged through the heat exchanger 160 by the refrigerant pump 158 with waste heat, e.g., from the bleed air source 186 and/or the cabin air compressor 188, can improve the efficiency of the ECS 100.

Figure 3:
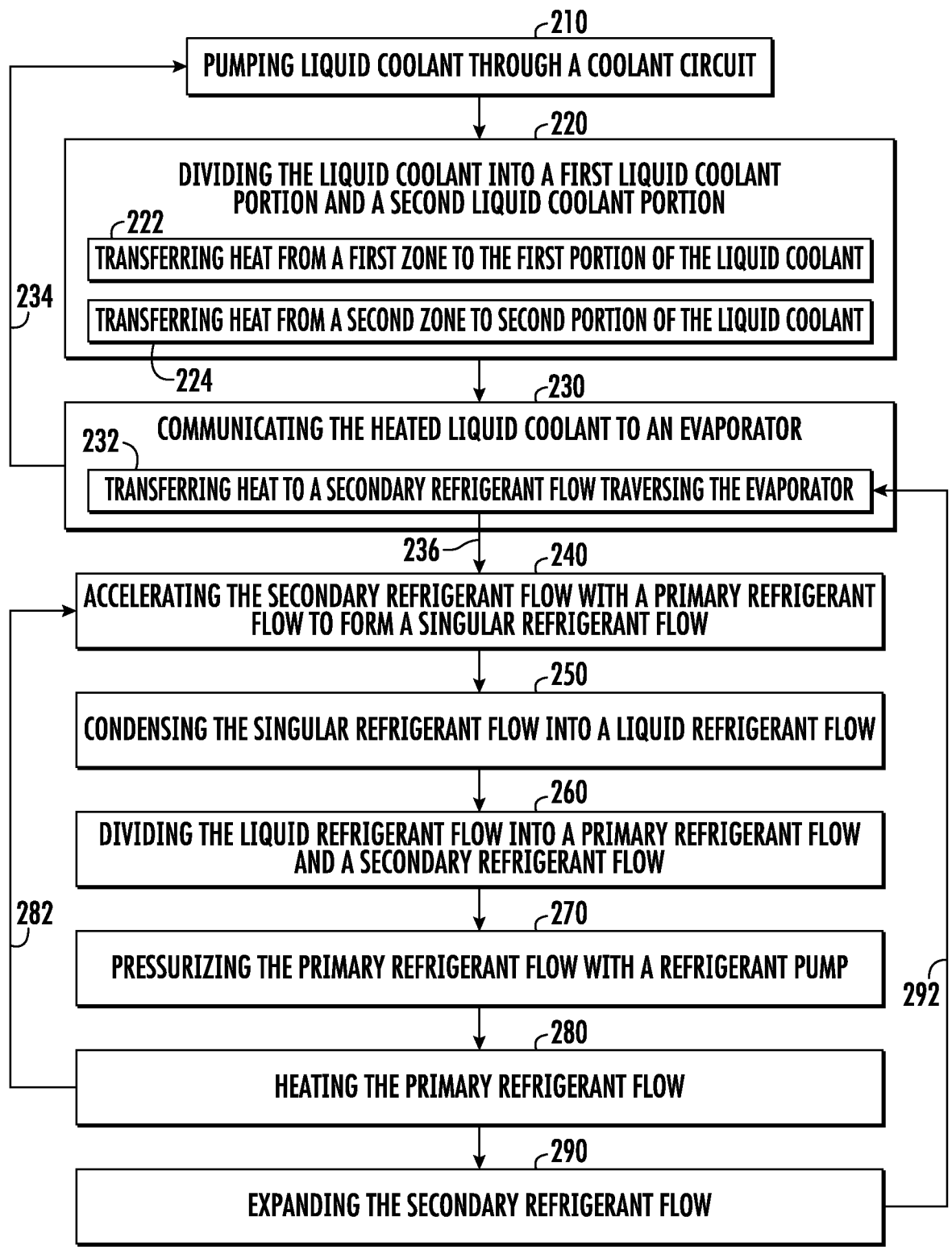
FIG. 3 is a block diagram of an environmental control method, showing steps of the method according to an illustrative and non-limiting example of an implementation of the method.

With reference to FIG. 3, the environmental control method 200 is shown. As shown with box 210, the method 200 includes pumping liquid coolant through a coolant circuit, e.g., the liquid coolant 116 (shown in FIG. 1) through the coolant circuit 104 (shown in FIG. 1). The liquid coolant is divided into a first liquid coolant portion and a second liquid coolant portion, e.g., the first liquid coolant portion 124 (shown in FIG. 1) and the second liquid coolant portion 130 (shown in FIG. 1), as shown with box 220. Heat from a first zone is transferred into the first liquid coolant portion, e.g., the first zone heat $H_1$ (shown in FIG. 1), and heat from a second zone is transferred into the second liquid coolant portion, the second zone heat $H_2$ (shown in FIG. 1). It is contemplated that the rate of heat transfer from the first zone to the first liquid coolant flow be independent of the rate of heat transfer from the second zone to the second liquid coolant flow, e.g., by throttling the first liquid coolant portion using the first segment flow control valve 120 (shown in FIG. 1) and/or by throttling the second liquid coolant portion using the second segment coolant flow control valve 126 (shown in FIG. 1).

The heated liquid coolant is communicated to an evaporator, e.g., the evaporator 144 (shown in FIG. 1), as shown with box 230. The evaporator transfers heat from the liquid coolant to a secondary refrigerant flow traversing the evaporator, e.g., the secondary refrigerant flow 194 (shown in FIG. 2), as shown with box 232. The liquid coolant is thereafter returned by the evaporator to the coolant circuit, as shown with arrow 234. The secondary refrigerant flow is communicated to an ejector, e.g., the ejector 146 (shown in FIG. 2), as shown with arrow 236.

The ejector accelerates the secondary refrigerant flow with a primary refrigerant flow, e.g., the primary refrigerant flow 192 (shown in FIG. 2), as shown with box 240. Once accelerated, the singular (intermixed) refrigerant flow including the primary refrigerant flow and the secondary refrigerant flow are communicated to a condenser, e.g., the condenser 152 (shown in FIG. 2). The condenser condenses the singular refrigerant flow into a liquid refrigerant flow, as shown with box 250, and thereafter communicates the singular refrigerant flow to a union, e.g., the union 148 (shown in FIG. 2). It is contemplated that singular refrigerant flow be cooled using an overboard air flow exiting the vehicle 10, e.g., the cold sink flow 164 (shown in FIG. 2), and flowing to the external environment. When the outside air is warmer than the temperature of the air inside the vehicle (and making up the overboard air flow) this allows the condenser to operate at a lower temperature than the temperature of the outside air.

The union divides the singular liquid refrigerant flow into the primary refrigerant flow and the secondary refrigerant flow, as shown with box 260. The primary refrigerant flow is communicated to a refrigerant pump, e.g., the refrigerant pump 158 (shown in FIG. 2), which pressurizes the liquid refrigerant forming the primary refrigerant flow, as shown with box 270. The pump in turn communicates the primary refrigerant flow to a heat exchanger, e.g., the heat exchanger 160, which adds energy to the primary refrigerant flow using a hot fluid flow, e.g., the hot fluid flow 184 (shown in FIG. 2), as shown with box 270. In certain examples the hot fluid flow contains waste heat, e.g., the from a bleed air flow, an electronics cooling system, or a cabin air compressor. It is also contemplated the hot air flow boil the liquid refrigerant prior to the primary refrigerant flow being communicated to the ejector.

Once heated, the primary refrigerant flow is communicated to the ejector for accelerating the secondary refrigerant flow in the ejector, as shown with arrow 282. The secondary refrigerant flow is in turn expanded, e.g., in the expansion valve 154 (shown in FIG. 2), as shown with box 290, and thereafter communicated to the evaporator for transferring further heat to the refrigerant circuit from the coolant traversing the coolant circuit, as shown with arrow 292.

ECSs can provide temperature control to multiple zones by cooling air to the lowest temperature required for each of the zones, adjusting air flow to each of the zones, and intermixing warmer air with the air provided to each of the zones. While generally acceptable for their intended purpose, such ECSs can be limited in terms of the number of zones and spatial distribution of the zones due to the size of the ducting necessary in such ECSs, particularly in vehicles, where space for ducting can be limited.

In examples described herein temperature control to zones is provided by flow-controlled liquid segments and a variable speed pump. In certain examples air flow to a liquid segment heat exchanger within a particular zone can also be used to provide temperature control. It is contemplated that a heat recovery module, such a heat exchanger in thermal communication with a hot source, drive a refrigerant ejector segment to provide evaporative cooling for the liquid segment. It is also contemplated that refrigerant traversing the ejector segment be condensed by cooling the refrigerant flow using a conditioned overboard air flow or an outside ram air flow, based on temperature and availability of the conditioned air flow and/or outside ram air flow. The condensed liquid refrigerant flow is in turn divided into a primary flow, which is pumped and boiled at the heat recovery module, and a secondary flow, which is expanded and boiled at an evaporator in thermal communication with the liquid segment.

Technical effects of the present disclosure include the capability to provide temperature control to zones remote from the refrigeration segment without employing ducts, limiting size of the ECS. Technical effects also include the capability to provide temperature control by throttling the liquid flow provided to a given zone instead of intermixing warmer air with air subsequent to cooling, limiting efficiency losses associated with cooling air to below the temperature required for the zone. Technical effects additionally include the capability to power the refrigeration segment with heat recovered from another system on the vehicle, e.g., waste heat, improving efficiency of the ECS. In certain applications low temperature air, e.g., cabin air conditioning air or outside ram air, can be used to condense refrigerant within the refrigerant segment, further improving efficiency of the ECS.

The term "about" is intended to include the degree of error associated with measurement of the particular quantity based upon the equipment available at the time of filing the application.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. An environmental control method, comprising:
    at an environmental control system including:
        a refrigerant circuit with a pump segment and an evaporator segment;
        an evaporator arranged along the evaporator segment and in fluid communication with the refrigerant circuit; and
        a coolant circuit extending through the evaporator, thermally coupled to refrigerant circuit by the evaporator, and
        having a first segment and a second segment arranged in parallel,
        dividing liquid coolant in the coolant circuit into a first liquid coolant portion and a second liquid coolant portion;
        transferring a first heat flow from a first zone to the first liquid coolant portion; and
    transferring a second heat flow from a second zone to the second liquid coolant portion,
    wherein
    the environmental control system further includes:
        an ejector fluidly coupling the pump segment of the refrigerant circuit with the evaporator segment of the refrigerant circuit,
        wherein the ejector comprises:
            a duct having a converging portion with a primary fluid inlet a diverging portion with an outlet, the converging and diverging portions connected via a throat;
            a secondary fluid inlet that fluidly couples the refrigerant evaporator segment to the converging portion;
            a nozzle supported within the converging portion of the duct with a nozzle outlet located within the converging portion, the nozzle fluidly coupling the primary fluid inlet to the ejector,
            wherein the outlet fluidly couples the converging portion of the duct to the evaporator segment and the pump segment of the refrigeration circuit via a condenser;
        wherein:
            a refrigerant is disposed within the refrigerant circuit,
            wherein the refrigerant is fluidly separated from the liquid coolant and in thermal communication with the liquid coolant through the evaporator; and
            an overboard air duct is in fluid communication with the condenser and in thermal communication therethrough with refrigerant traversing the condenser.

2. The method of claim 1, further comprising:
    communicating the first liquid coolant portion and the second liquid coolant portion to the evaporator;
    transferring coolant circuit heat from the liquid coolant to a secondary refrigerant flow traversing the evaporator; and
    accelerating the secondary refrigerant flow with a primary refrigerant flow to form a singular refrigerant flow.

3. The method of claim 1, wherein
    the environmental control system further includes a coolant pump arranged along the coolant circuit, wherein the first segment and the second segment are fluidly coupled to the evaporator by the coolant pump.

4. The method of claim 1, wherein
    the coolant is in a liquid state throughout the coolant circuit.

5. The method of claim 1, wherein
    the refrigerant is in a liquid state in a first portion of the refrigerant circuit, wherein the refrigerant is in a vapor state in a second portion of the refrigerant circuit.

6. The method of claim 1, wherein
    the environmental control system further includes a heat exchanger arranged along the refrigerant circuit.

7. The method of claim 6, wherein
    the environmental control system further includes a fluid flow in fluid communication with the heat exchanger and in thermal communication therethrough with refrigerant traversing the refrigerant circuit.

8. The method of claim 6, wherein
the environmental control system further includes a bleed air source, a cabin air compressor, or an electronics cooling system thermally coupled to the heat exchanger.

9. The method of claim 6, wherein
the environmental control system further includes a refrigerant pump.

10. The method of claim 1, wherein
the environmental control system further includes a union fluidly coupling the pump segment of the refrigerant circuit with the evaporator segment of the refrigerant circuit.

11. The method of claim 1, wherein
the environmental control system further includes:
    a union fluidly coupling the pump segment of the refrigerant circuit with the evaporator segment of the refrigerant circuit; and
    the condenser fluidly coupling the ejector to the union of the refrigeration circuit.

12. The method of claim 1, wherein
the environmental control system further includes
a controller operatively connected to the coolant circuit and responsive to instructions recorded on a memory to:
    throttle the first liquid coolant portion independent of the second liquid coolant portion; and
    throttle the second liquid coolant portion independent of the first liquid coolant portion.

13. The method of claim 12, wherein
the environmental control system further includes:
    a coolant pump arranged along the coolant circuit; and
    a refrigerant pump arranged along the refrigerant circuit, wherein the controller is operatively connected to the coolant pump and the refrigerant pump to control thermal communication between the coolant circuit and the refrigerant circuit through the evaporator.

14. The method of claim 12, wherein
the controller is further configured to:
    drive a first zone temperature within a first zone in thermal communication with the first segment to a first temperature target; and
    drive a second zone temperature within a second zone in thermal communication with the second segment to a second temperature target.

\* \* \* \* \*